April 8, 1958 V. L. PEICKII 2,829,442
MEANS FOR INSPECTING SCREW THREADS
Filed Oct. 27, 1954 3 Sheets-Sheet 1
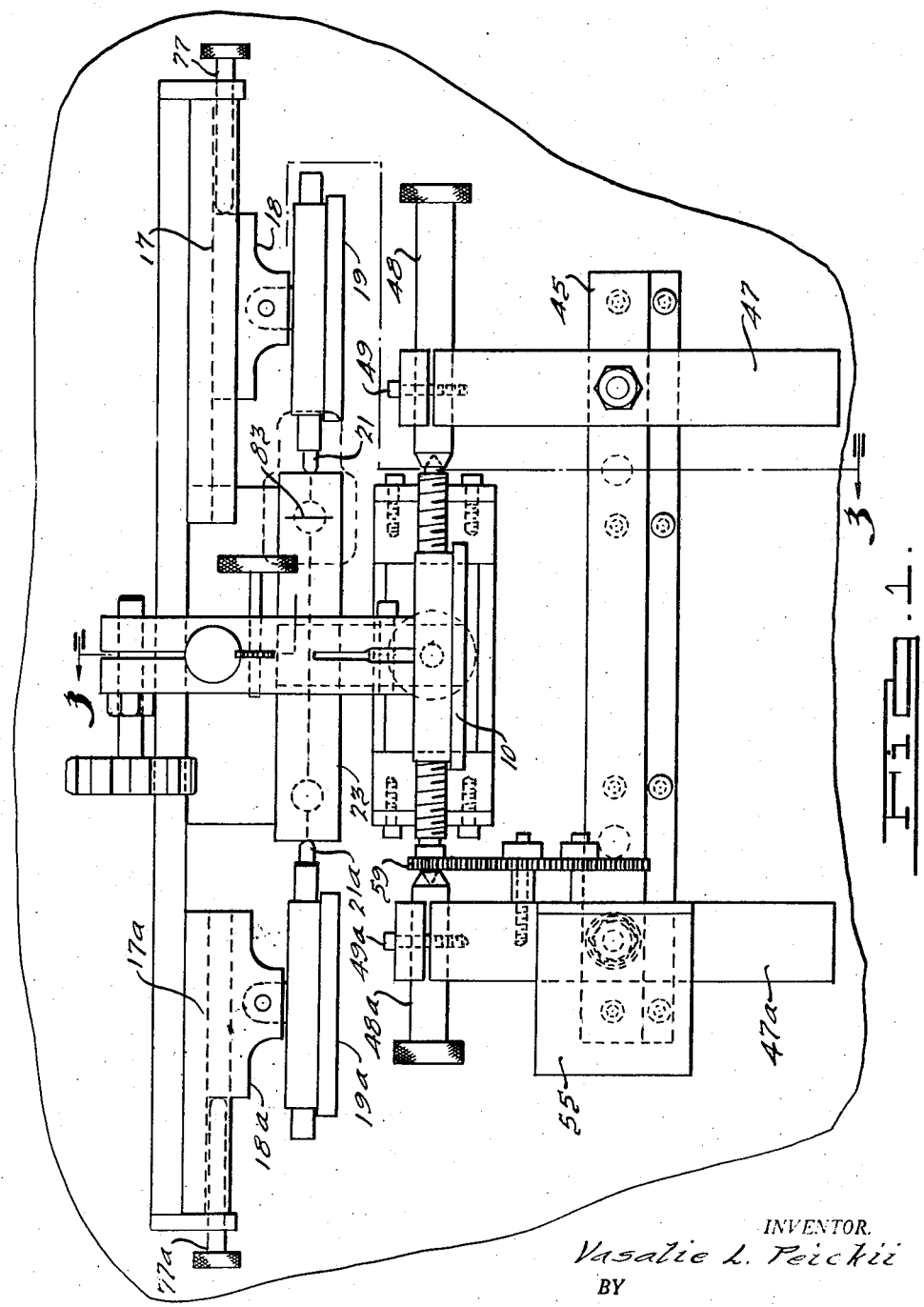
INVENTOR.
Vasalie L. Peickii
BY
Harness, Dickey & Pierce
ATTORNEYS.

April 8, 1958
V. L. PEICKII
2,829,442
MEANS FOR INSPECTING SCREW THREADS
Filed Oct. 27, 1954
3 Sheets-Sheet 2
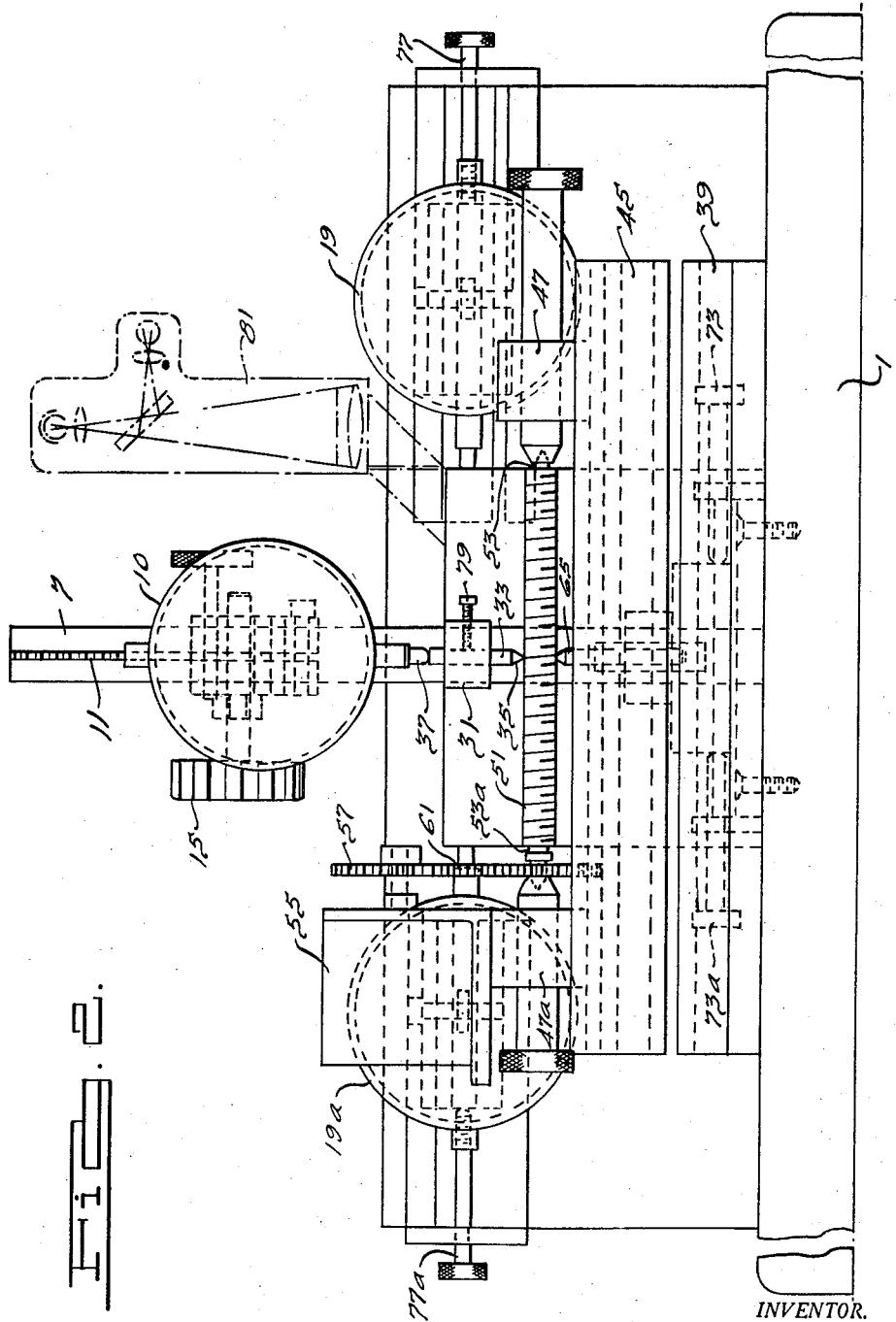
INVENTOR.
Vasalie L. Peickii
BY
Harness, Dickey & Pierce
ATTORNEYS.

April 8, 1958  V. L. PEICKII  2,829,442
MEANS FOR INSPECTING SCREW THREADS
Filed Oct. 27, 1954  3 Sheets-Sheet 3
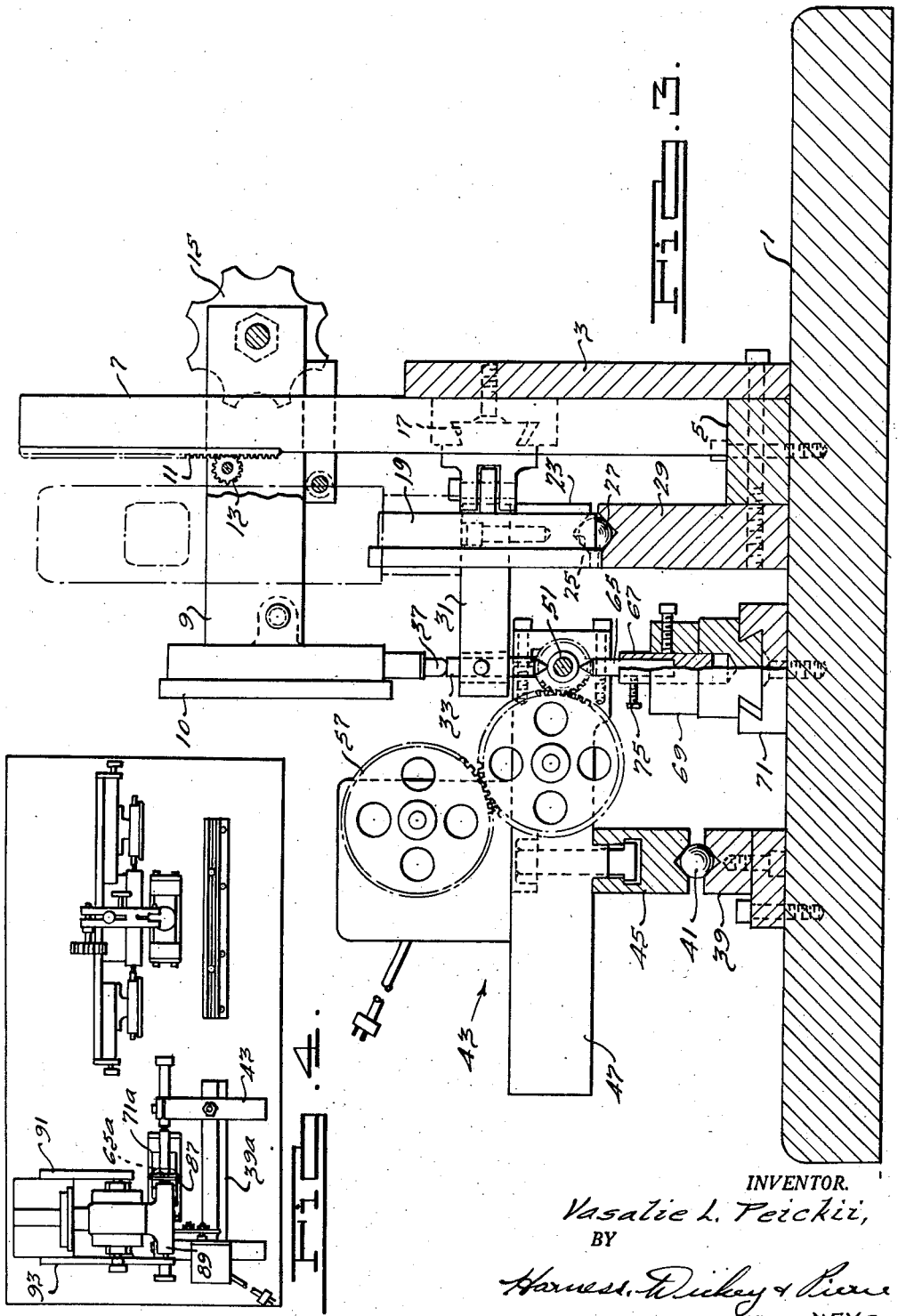
INVENTOR.
Vasalie L. Peickii,
BY
Harness, Dickey & Pierce
ATTORNEYS.

United States Patent Office 2,829,442
Patented Apr. 8, 1958

2,829,442

MEANS FOR INSPECTING SCREW THREADS

Vasalie L. Peickii, San Mateo, Calif., assignor to Micromatic Hone Corporation, Detroit, Mich., a corporation of Michigan Application October 27, 1954, Serial No. 465,000

5 Claims. (Cl. 33—199)

This invention relates to a device for inspecting the helical characteristics of threaded components, such as screw-threads, worms, and the like.

One object of the invention is to provide a simple and effective means for detecting the location and degree of imperfection of form, lead, pitch-wobble and diametric error in threaded elements, such as above-named.

Another object is to provide a means whereby such components may be mounted upon their generative axes, revolved about and advanced along said axis to determine the amount and locale of error therein.

Another object is to provide a means whereby such errors may be corrected in a companion device and rechecked without demounting the workpiece from its generative mounting.

Another object is to provide a systematic method of alternately inspecting and correcting helical contours of work elements to remove error therefrom, which eliminates the prospect of creating additional error resulting from re-fixturing of the workpiece as is occasioned under other systems. The overall principles of this invention are such as are shown and described in my copending application, Serial No. 464,999, filed October 27, 1954, assigned to the assignee of this application, and in the combinations of elements and arrangements shown and described herein; wherein:

Figure 1 is a plan view of a deveice embodying the principles of this invention;

Fig. 2 is a front elevation thereof;

Fig. 3 is an end-view thereof with a partial cross section through line 3—3 of Fig. 1; and Fig. 4 is a plan view of a checking fixture embodying the principles of the present invention mounted on a common base with the dressing fixture shown and described in my copending application as described above.

The entire machine is mounted and supported on a base plate 1 toward the rear of which a vertical supporting member 3 is fixedly mounted by means of a block 5. The supporting member 3, in turn, retains a vertical column 7 in an upright position. Adjustably clamped on the column 7 is a horizontal arm 9 carrying a dial indicator 10 at the forward end thereof. The column 7 is provided with a rack 11 toward the top thereof which cooperates with a manually operable pinion 13, rotatably mounted on the arm 9, to raise and lower the dial indicator 10. Once the pinion 13 has been adjusted to raise the dial indicator 10 to the desired position, it may be locked in position by manually operable lock screw 15.

Member 3 is provided on its forward surface with two dovetailed guides 17 and 17a disposed toward opposite ends thereof. Dovetailed slides 18 and 18a are slidably mounted in the guideways 17 and 17a respectively and each has a dial indicator 19 and 19a pivotally mounted at the forward end thereof. The dial indicators 19 and 19a are provided with extensible rods 21 and 21a which operate the indicators as they are compressed or extended. The rods 21 and 21a are aligned and project toward one another, abutting the opposite ends of a transversely slidable member 23. Member 23 is provided with a V-type guideway 25 at the bottom thereof which rests on balls 27 which are mounted in a V-block 29. V-block 29 is fixedly mounted on the base 1 so as to provide a firm support on which the member 23 is frictionlessly slidable. It may be seen that the dial indicators 19 and 19a indicate the amount of transverse movement of the member 23.

Projecting forwardly from member 23 is a horizontal arm 31 at the forward end of which a vertical indicating finger 33 is slidably housed. The lower tip 35 of the finger 33 is shaped to closely fit the side flanks of the helical threads of the threaded workpiece which is to be checked. However the extremity of the tip 35 is truncated sufficiently to clear the root of the helix. In this manner the finger 33 will be subjected to vertical movement by variations in the dimension of the side flanks of the threads as the threads of the workpiece are advanced past the tip 35. An extensible indicating rod 37 forming a part of dial indicator 10 abuts the upper extremity of finger 33 so as to measure any vertical movement thereof.

A V-block 39 is fixedly mounted on the forward portion of the base carriage 1 and extends across the base 1. Balls 41 are disposed on the block 39 so as to provide a frictionless mounting for a work-holding carriage, generally indicated at 43, which rests thereon. The work-holding carriage includes a supporting bar 45 having a V-groove along the bottom thereof which engages the balls 41. Transversely mounted across the supporting bar 45 is a pair of spaced arms 47 and 47a which carry aligned work centers 48 and 48a at the rear ends thereof. The work centers 48 and 48a are clamped in adjusted position by screws 49 and 49a to conform to workpieces of varying lengths.

The workpiece 51, which is to be checked, is provided with pointed ends 53 and 53a which are disposed within the work centers 48 and 48a so that the workpiece 51 is rotatably supported therebetween. The arms 47 and 47a are of such length that the center of the workpiece is positioned directly below the finger 33 so that the finger 33 engages the threads of the workpiece.

A motor 55 rotatably driving the workpiece is mounted on pivot arm 47a and provided with a straight spur gear 57 on its drive shaft. Pivot end 53a is provided with a pinion 59 which is dogged thereto. An intermediate gear 61 rotatably mounted on arm 47a interconnects and meshes with gear 57 and pinion 59 so as to drivably connect the motor 55 to the workpiece.

It is apparent that the work-holding carriage consisting of the supporting bar 45, the arms 47 and 47a, the work centers 48 and 48a, the motor 55, and the power connecting means along with the workpiece form an integral unit which is no way affixed to the rest of the machine. It rests freely on the balls 41 and may be lifted therefrom as a unit. This assembly of parts is identical to that shown and described in my copending application mentioned above, and the same carriage is designed to be used with both machines. After a workpiece has been dressed on the machine disclosed in my copending application, the work holder and workpiece may be removed therefrom and used with the machine of the present invention as a unit. This eliminates the necessity of removing the workpiece from its mountings and then refixturing it for the checking operation, which procedure is likely to increase the chance of error in the measurements. Furthermore this procedure eliminates the time wasted in refixturing the workpiece. Thus it is feasible to frequently check a workpiece during a dressing operation.

The preponderance of weight of the carriage lies at the end supporting the workpiece and the carriage will therefore tend to tip downwardly at that end. In order to support the carriage and also to advance the threads of the workpiece past the finger 33, a follower finger 65 engages the thread of the workpiece at the underside thereof. The finger 65 is housed for adjustable vertical movement in a housing member 67. The member 67 is in turn fitted in a supporting member 69 which has a dovetailed base portion at the bottom thereof. A dovetailed guideway 71 is fixedly mounted on the base 1, the member 69 being slidably mounted on the guideway 71 with its dovetailed portion disposed in the dovetailed guideway thereof. Set screws 73 and 73a permit the member 69 to be secured in any position along the guideway 71. This permits positioning the finger 65 in any location desired on the workpiece. The upper tip of the finger 65 is similar in shape to the tip 35, that is, it is shaped to conform to the side flanks of the threads and has a truncated end so as to permit clearance at the root of the thread. The finger 65 is adjusted in height by means of set screw 75 so that the arms 47 and 47a are substantially level. Also the finger 65 may be rotated laterally to conform to the pitch of the thread. Member 69 is moved axially along the guideway 71 so as to position the finger 65 substantially opposite the finger 33, being out of vertical alignment therewith by an amount equal to one half the lead of the workpiece thread. As the workpiece is driven in rotation, it will be caused to move axially by the engagement of the finger 65 with the threads. Finger 65 being fixed in position, the thread will advance thereon. The carriage 43 which supports the workpiece being slidable on the bearings 41 in a direction parallel to the generative axis of the threads of the workpiece, the axial movement of the workpiece is in no way limited.

As the workpiece rotates, the finger 33 will ride on the workpiece through the entire length of thread. During this operation, any error in lead between the finger 65 and finger 33 will cause the member 23 to move laterally along the guideway 29. This lateral movement is measured by indicators 19 and 19a. At any time the indicators may be set at their zero point by the adjustment of screws 77 and 77a. The member 23, resting on the balls 27, is easily subjected to the aforementioned lateral movement which is measurable with sufficient accuracy for general purposes by the indicators 19 and 19a.

Dial indicator 10 serves to measure any deviations in pitch diameter which might exist throughout the peripheral length of the thread. Finger 33 is secured in position in its supporting arm 31 by means of set screw 79, so that the arm 31 is substantially level. Member 23 is thus supported on the balls 27 and by the finger 33 resting on the workpiece. As variations in the pitch diameter of the threads occur under the finger 33, the finger 33 will thus be permitted to move vertically so as to operate the dial indicator 10. This vertical movement is permitted by the pivoting of member 23 on the balls 27.

In instances where extreme precision is required which is unobtainable by the use of mechanical dial-type indicators, the use of either a graduated microscope or an interferometer, as shown at 81, may be necessary. In such cases it has been found advantageous to provide a graduate line as indicated at 83 on the upper side of the member 23. This line serves as a point of reference to detect minute lengthwise movement of the member 23 which is otherwise undetectable by the dial indicators 19 and 19a.

In the practice of this invention, it has been found practical to rotate the workpiece while mounted on the carriage 43 until such points are reached where error is shown to exist. At this point the carriage and workpiece are transferred as a unit to the companion grinding machine, described in the above-mentioned copending application, for the correction of the error. Thereafter the carriage and workpiece are returned to the checking fixture and the inspection procedure is continued.

Fig. 4 illustrates the manner in which the checking fixture of the present invention might be mounted on a common base with the dressing fixture mentioned above, for convenient use therewith. The dressing fixture, as illustrated in Fig. 4, is on the left-hand side of the base. It includes a V-block 39a identical with the V-block 39, for supporting the workholding carriage 43. It also includes a guideway 71a on which a finger 65a is adjustably mounted, these parts being identical to guideway 71 and finger 65. Furthermore, the machine operates in essentially the same manner as does the checking fixture to cause the advancement of the thread of the workpiece. This machine differs from the checking fixture in the provision of a dressing tool 87 for engaging the workpiece, instead of the measuring finger 33. The dressing tool 87 is a grinding or lapping wheel, driveably mounted on an arm 89, which, in turn, is trunnioned between two parallel supporting frames 91 and 93. The workpiece is advanced past the dressing tool by the rotation of the workpiece on the finger 65a whereby the entire length of the workpiece may be dressed. After the dressing operation, the carriage and workpiece may be removed intact for reinstallation on the checking fixture. By the periodic transfer of the carriage and workpiece from the checking fixture to the dressing fixture and back again, it has been found possible to produce extremely precise threads, worms, and other helically contoured surfaces.

While it will be apparent that the preferred embodiment of the invention herein described is well calculated to fulfill the objects and advantages first above stated, it will be appreciated that the invention is susceptible to variation, modification and change without departing from the fair meaning and proper scope of the appended claims.

What is claimed is:

1. A checking instrument for locating and measuring imperfections in threads including, in combination, a carriage for supporting the threaded workpiece for movement along the thread axis and for rotation about said axis, means engaging the thread of the workpiece for causing said workpiece to advance when rotated, a block mounted for movement parallel to the thread axis, a gauging instrument in contact with said block, a second thread engaging means carried by said block causing it to move parallel to the axis of the thread conforming to certain variations in the thread, said second thread engaging means being movable normal to the thread axis, and a second gauging instrument movable by said second thread engaging means when moved normal to the thread axis by certain variations in the thread.

2. A checking instrument for locating and measuring imperfections in threads including, in combination, a base, a carriage, means on said carriage for rotatably supporting a workpiece having a thread thereon to be checked, ball means on said base for supporting said carriage for movement parallel to the thread axis, means mounted on said base for engaging a groove of the thread, a second carriage on said base also mounted for movement parallel to the thread axis, a second thread engaging means on said second carriage causing said second carriage to move in accordance with variations in the lead of the thread, and a gauging instrument in the path of movement of said second carriage for providing visual indications of said variation.

3. A checking instrument for locating and measuring imperfections in threads including, in combination, a base, a carriage, means on said carriage for rotatably supporting a workpiece having a thread thereon to be checked, ball means on said base for supporting said carriage for movement parallel to the thread axis, means mounted on said base for engaging a groove of the thread, a second carriage on said base also mounted for movement parallel to the thread axis, a second thread engaging means on said second carriage causing said second carriage to move in accordance with variations in the lead of the thread, a gauging instrument in the path of movement of said second carriage for providing visual indications of said variation, said second thread engaging means being movable with said second carriage normal to the thread axis, and a second gauging instrument in engagement with said second thread engaging means and operable thereby to indicate variations in the pitch diameter of the thread.

4. A checking instrument for locating and measuring imperfections in threads including, in combination, a base, a carriage supported on said base for movement along the axis of the thread, thread engaging means mounted on said carriage, a gauging instrument engaged by said carriage and operated thereby to indicate the carriage movement, and a second gauging instrument mounted on said base and actuated by said thread engaging means when the latter is moved normal to the carriage movement.

5. A checking instrument for locating and measuring imperfections in threads including, in combination, a base, a carriage supported on said base for movement parallel to the thread axis, thread engaging means mounted on said carriage, a gauging instrument engaged by said carriage and operated thereby to indicate the carriage movement, a second gauging instrument mounted on said base and engaged by said thread engaging means when moved normal to the carriage movement, a second carriage on said base, a second thread engaging means on said base, said carriage being a separate unit movable to and from said base, and means on said second carriage for rotatably supporting a workpiece having a thread thereon to be checked, whereby when said workpiece is rotated the second carriage will be moved due to the engagement of the second thread engaging means with the workpiece thread and said thread will be gauged by the movement of said first thread engaging means either parallel to the axis of the thread or normal thereto.

References Cited in the file of this patent

UNITED STATES PATENTS

| | | |
|---|---|---|
| 1,503,320 | Hardel | July 29, 1924 |
| 1,782,154 | Thomas | Nov. 18, 1930 |
| 1,980,554 | Schict | Nov. 13, 1934 |
| 2,321,903 | Fox | June 15, 1943 |
| 2,407,576 | Rickenmann | Sept. 10, 1946 |
| 2,409,924 | Bauer | Oct. 22, 1946 |
| 2,547,681 | Aller | Apr. 3, 1951 |